United States Patent [19]

Lenhardt et al.

[11] Patent Number: 4,803,764

[45] Date of Patent: Feb. 14, 1989

[54] APPARATUS FOR MANUFACTURING A SPACER FRAME FOR INSULATING GLASS

[75] Inventors: Karl Lenhardt, Neuhausen-Hamberg; Uwe Bogner, Pforzheim-Huchenfeld, both of Fed. Rep. of Germany

[73] Assignee: Lenhardt Maschinenbau GmbH, Neuhausen-Hamberg, Fed. Rep. of Germany

[21] Appl. No.: 63,297

[22] Filed: Jun. 17, 1987

[30] Foreign Application Priority Data

Jun. 19, 1986 [DE] Fed. Rep. of Germany ....... 3620531

[51] Int. Cl.[4] ............ B23P 23/04

[52] U.S. Cl. ............ 29/33 K; 29/33 T; 29/517

[58] Field of Search ............ 29/33 K, 33 T, 517; 72/306, 380; 52/475, 656, 658

[56] References Cited

U.S. PATENT DOCUMENTS

| | | | |
|---|---|---|---|
| 799,176 | 9/1905 | Marble et al. | 29/517 |
| 2,101,349 | 12/1937 | Sharp | 52/656 |
| 3,728,889 | 4/1973 | McIver et al. | 29/517 |
| 4,261,145 | 4/1981 | Bröcking | 52/656 X |
| 4,574,553 | 3/1986 | Lisec | 52/658 |
| 4,597,279 | 7/1986 | Lisec | 72/306 |

FOREIGN PATENT DOCUMENTS 2128717 6/1971 Fed. Rep. of Germany .

*Primary Examiner*—P. W. Echols
*Assistant Examiner*—Andrew E. Rawlins
*Attorney, Agent, or Firm*—Balogh, Osann, Kramer, Dvorak, Genova & Traub

[57] ABSTRACT

A process is disclosed in which a rectangular spacer frame (16) for insulating glass is automatically manufactured in that a tubular bar is repeatedly bent in a common bending plane (5) and its free ends (19, 20) are joined. One or both end portions of the tubular bar are deflected out of the bending plane (5) during the final bending operation so that the free ends (19, 20) are moved to such positions that said extremities are laterally spaced apart and extend alongside each other. The end portions (17, 18) of the tubular bar are then gripped and moved to positions in which they are axially aligned and spaced apart. The free ends of said end portions are subsequently joined to each other to form the spacer frame (16), which is subsequently transferred to an overhead conveyor (69) in an automatic operation.

21 Claims, 9 Drawing Sheets

APPARATUS FOR MANUFACTURING A SPACER FRAME FOR INSULATING GLASS

BACKGROUND OF THE INVENTION

1. Field of the Invention

This invention relates to a process of manufacturing a spacer frame for insulating glass, in which a tubular bar is bent four times in a common plane and the ends of the bent bar are joined to each other.

This invention relates also to an apparatus for manufacturing a spacer frame for insulating glass in that a tubular bar is bent four times in a common plane and the ends of the bent rod are joined to each other, which apparatus comprises a horizontal or inclined backing wall, a holder for holding a tubular bar to be bent, which holder is disposed at one edge of the backing wall, and one or more bending tools, which are disposed at said edge of the backing wall and are operable to bend said bar in a bending plane which coincides with the planar top surface of the backing wall.

2. Description of the Prior Art

A process and apparatus of the kind described hereinbefore have been disclosed in German Patent Specification No. 32 23 881.

In that apparatus the backing wall consists of a plate, which is inclined 10 to 15 degrees from the horizontal. Two bending tools are provided at the top edge of said plate, and are displaceable along that edge. A holder for the tubular bar to be bent is also provided at that top edge of the plate between the bending tools and comprises a plurality of angled supporting brackets for supporting the tubular bar, and a pair of gripping jaws for holding the tubular bar in position. Each bending tool comprises an abutment for guiding and supporting the tubular bar and a pressure-applying roller, which is operable by a toggle joint to cooperate with the abutment so as to act on the tubular bar and to bend said bar about a bending edge of the abutment. The pressure-applying roller is pivoted on an axis which is at right angles to the plate, which has a planar upper surface which coincides with the bending plane. During the bending operation the laterally bent portions of the tubular bar are sliding on the plate.

The two bending tools are operated at the same time. In a first bending operation the tubular bar is formed with two bends to assume a U shape. In a second bending operation, two additional bends are formed between the first and second bends in the tubular bar to form said bar into a rectangular frame. Between the two dual bending operations the two bending tools are moved toward each other.

When all four corners of the spacer frame have been bent, the free ends of the tubular bar contact each other but have not yet been joined to each other. When the bending operations have been completed, the semifinished spacer frame is lifted out of the bending tools and the holder disposed between the bending tools by a mechanical ejector and slides down on the plate and is then taken up by hand and is closed in that a plug connector is inserted into the two free ends of the bent tubular bar. The spacer frame can then be used for its intended purpose.

The known apparatus has the disadvantage that it permits only the bending operations to be automatically performed whereas the frames must be closed at a location which is outside the bending apparatus and said closing is performed either by hand or in a separate closing apparatus to which the frame is transferred by hand. Another disadvantage resides in the springback which is exhibited by the two end portions of the tubular bar when the latter has been bent and the resulting frame is released from the bending tools. As a result of that springback the end portions of the tubular bar are no longer axially aligned but extend at an angle to each other so that a stress will be maintained in the spacer frame when it has been closed. Besides, the angular misalignment of the end portions of the tubular bar which has been released by the bending tools is entirely undesirable for a desirable automatic closing of the spacer frame.

SUMMARY OF THE INVENTION

It is a first object of the invention to provide a process which is of the kind described first hereinbefore and in which a tubular bar can be bent and the resulting spacer frame can be closed by operations which are automatically performed in the same apparatus.

It is a second object of the invention to provide an apparatus which is of the kind described first hereinbefore and in which said process can be carried out substantially without a need for manual work.

In a process of the kind described first hereinbefore said first object is accomplished in that one or two of the end portions of the tubular bar is or are deflected out of the bending plane so that said end portions are laterally spaced apart, and said spaced apart end portions are gripped, moved into axial alignment with each other, and joined to each other.

In an apparatus of the kind described first hereinbefore, the second object stated above is accomplished in that a frameclosing tool is provided, which is displaceable parallel to the backing wall toward and away from said horizontal edge, and said frame-closing tool comprises means for deflecting one end portion of the tubular bar out of the bending plane as the two end portions of the tubular bar approach each other, the frame-closing tool also comprises locating means for locating the ends of the tubular rods in an aligned position, in which they are axially aligned and spaced apart, and two grippers are provided, which are movable toward each other in a direction which is parallel to the bending plane so as to move the end portions of the tubular bar to a position in which the free ends of said end portions are closed to each other.

In the process in accordance with the invention one or both ends of the tubular bar is or are deflected out of the bending plane, preferably during the final bending operation, so that the two ends of the tubular bar are laterally spaced apart and extend alongside each other. For this reason the tubular bar can be bent to form bends exceeding an angle of 90° to such an extent that the springback of the bent tubular bar will cause all four corners of the resulting spacer frame to have an angle of exactly 90° and the two free ends of the spacer frame will not strike each other as a result of the springback after the final bending operation. If the two end portions of the tubular bar were constrained to move only in the bending plane during the bending operation in the usual practice, they would strike on each other and this might result in an undesired deformation of said end portions. The lateral spacing of the ends of the tubular bar will be particularly desirable if a plug connector has been inserted into one of end portions of the tubular bar before the beginning of the bending operation and that connector is used to close the spacer frame when the tubular bar has been bent to form the frame. In that case the spacer frame can be closed in that the protruding end of the plug connector is inserted into the opposite end portion of the tubular bar. Because the plug connector protrudes from the tubular bar, the latter could not be bent through 90° or through more than 90° during the final bending operation if the end portions of the bar were not laterally offset from each other.

When the two end portions of the tubular bar are laterally offset, as proposed, a bending through more than 90° can easily be performed even when a plug connector has been inserted into one of the two end portions before. When the bending operations have been completed and the bending tools are disengaged from the tubular bar, the two end portions of that bar remain laterally spaced apart in an ideal position, in which they can be gripped by mechanical means and moved to a position in which they are axially aligned so that they can be joined. The two end portions may be joined by soldering, welding or preferably by a plug connector. Whereas the plug connector might be inserted into both end portions of the tubular bar after the final bending operation, it is preferably inserted into one of the two end portions before the bending operations and into the opposite end portion of the tubular bar after the final bending operation. In that sequence of operations the mechanical handling means required for automation can easily be provided and operated.

Because the lateral offset of the two ends of the tubular bar is not required until the final phase of the final bending operation, that offset is preferably effected only during the final phase of the final bending operation. In that case a uniform lateral offset can be provided even when spacer frames differing in size are made in succession whereas those phases of the bending operations which precede the deflection of one end portion can be carried out on a backing wall, which is flush with the bending plane and provides a lateral guidance and support for the relatively unstable tubular bars so that an undesired fluttering of the tubular bars during the bending operations will be prevented.

The apparatus in accordance with the invention comprises a horizontal or inclined backing wall, which may be constituted by one or more plates. The plates may be formed with apertures or recesses. A holder for the tubular bars to be bent is provided at one horizontal edge of the backing wall. That holder may consist, e.g., of holding bar for engaging or supporting the tubular bar or of a series of holding fingers, and each tubular bar may be moved by hand or by a mechanical placing apparatus into engagement with said holding bar or holding fingers before the bending operations. The holder suitably comprises also an end stop, which is displaceable along the holder and defines as axial position for the tubular bars, and gripping means for fixing the tubular bars in that position.

The backing wall serves to back the tubular bars during the bending operations. For this reason the bending tools are so arranged relative to the backing wall that the upper surface of the backing wall is flush with the bending plane, which is the plane in which portions of the tubular bar are moved during the bending operations. If the backing wall is inclined, the holder for the tubular bars preferably extends along and adjacent to the bottom edge of the backing wall. The holder might also be provided at a different location, particularly at the top edge of the backing wall, as is described in German Patent Specification No. 32 23 881. But the provision of a holder extending adjacent to and along the bottom edge of the backing wall will facilitate an automatic removal of the spacer frames from the apparatus in the embodiment of the invention recited in claims 21 to 26.

The apparatus comprises at least one bending tool and preferably comprises two bending tools. In a apparatus comprising only one bending tool, the four corners of the spacer frame are bent in succession and for that purpose the bending tool must be displaceable, e.g., by means of the above-mentioned stop, along the holder for the tubular bar, or the tubular bar must be displaceable by said stop so that the bending tool can be moved into engagement with the tubular bar at those portions thereof which are to be formed with bends. In the preferred apparatus comprising two bending tools, said two bending tools are suitably operated simultaneously in such a manner that two bends are formed in a first bending operation at the same time so that the tubular bars assumes the shape of a U, the bending tools are subsequently approached to each other—for that purpose at least one bending tool must be displaceable along the holder and preferably both bending tools are displaceable along the holder—and two additional bends are subsequently formed in the tubular bar so that a rectangular spacer frame is formed, which is subsequently closed in that the two end portions of the tubular bar are joined.

In accordance with the invention the means for closing the frame comprise a frame-closing tool, which is displaceable parallel to the backing wall toward and away from that edge of the backing wall at which the holder and the bending tools are provided and is provided with means for deflecting one end portion of the tubular bar out of the bending plane as the two end portions of the tubular bar approach each other. When one end portion of the tubular bar is deflected, the tubular bar can be bent at each corner through more than 90° to such an extent that the springback will be compensated in such a manner that when the bending tools have released the tubular bar after the final bending operation the end portions of said bar will be laterally spaced apart and extend alongside each other.

Because the means for deflecting the end portion of the tubular bar are provided on the frame-closing tool, that end portion of the tubular bar which is to be laterally deflected will not be deflected until the final phase of the final bending operation affecting that end portion and the backing wall can perform its intended function to guide and back tubular bar portions as they are pivotally moved during the bending operations. An adaptation to spacer frames differing in size is permitted in that the distance from the frame-closing tool to the holder for the tubular bar, which holder is provided near the backing wall, can be changed in that the frame-closing tool is displaced parallel to the backing wall. That displacement is suitably effected at right angles to the longitudinal direction of the bar holder or to that edge of the backing wall which is provided with the bar holder. The two bending tools are disposed on opposite sides of the path of movement of the frame-closing tool and preferably are spaced equal distances from that path.

Before or during the bending of a tubular bar to form a spacer frame, the frame-closing tool is moved to that spaced-apart position which is required for that spacer frame. After the final bending operation the end portions of the tubular bar will have the intended lateral offset in a transverse plane, which is parallel to the plane in which the tubular bar is supported by the bar holder. The frame-closing tool is preferably provided with one or more stops, which is or are disposed in said transverse plane and after the final bending operation said stops locating the end portions of the tubular bar in a predetermined position before said end portions are joined to each other. Because the tubular bar has been bent through more than 90°—such overbending is permitted because the two end portions of the tubular bar are laterally offset—the two end portions of the tubular bar which have been released by the bending tools will not disengage the associated stops in most cases. Nevertheless, the frame-closing tool is preferably provided with holding-down members, particularly holding-down rollers, which from retracted end position behind or below the bending plane are pivotally movable against the stop or stops and force the end portions of the tubular bar against the associated stop or stops during the subsequent locating steps.

The means for deflecting an end portion of the tubular bar out of the bending plane preferably comprise a deflecting guide member, which is mounted on the frame-closing tool and is retractable behind the bending plane and provided with a sliding surface for sliding contact with one end portion of the tubular bar during the final bending operation. That sliding surface has such an inclination relative to the bending plane that the associated bar end portion sliding on the sliding surface will be lifted from the backing wall and will thus be deflected out of the bending plane. The other end portion of the tubular bar need not be deflected but should be backed and guided by the backing wall throughout the bending operations. But because incidental deflections of said other end portion during the bending operation may not be precluded, the frame-closing tool is preferably provided with a depressing guide member, which has a sliding surface for sliding contact with said other bar end portion during the final bending operation. The sliding surface of that depressing guide member has such an inclination to the bending plane that the bar end portion sliding on that sliding surface is urged toward the backing wall by said sliding surface. The depressing guide member, the deflecting guide member and the stops for limiting the pivotal movement of the bar end portions are mounted on the frame-closing tool and cooperate so as to compel the two end portions of the tubular bar to assume a predetermined position at the end of the final bending operation.

For a further locating action on the ends of the tubular bar the closing tool is provided with locating means for moving the end portions of the tubular bar to a position in which they are axially aligned and axially spaced apart. For that purpose the frame-closing tool is preferably provided with two end stops, which are spaced an adjustable distance apart and are engageable by the free ends of the first and second end portions of the tubular bar. The two end stops are preferably formed on the deflecting and depressing guide members, respectively, in such a manner that the two end stops face each other and the end stop for engaging the free end of a first end portion of the tubular bar is formed on or disposed behind the deflecting guide member for acting on the second bar end portion and the end stop for engaging the free end of the second bar end portion is formed on the depressing guide member for acting on the first end portion of the tubular bar.

The two end stops, which are spaced an adjustable distance apart, can be operated to expand the spacer frame when it has not yet been closed, and holding-down rollers are preferably provided and prevent a pivotal movement of the bar end portions as the frame is thus expanded. The two end portions of the spacer frame which has not yet been closed are spread apart to such an extend that they no longer overlap. If the spacer frame is closed by means of a plug connector, the latter is preferably inserted into one of the end portions of the tubular bar before the bending operations are performed and the spacer frame must be expanded to such an extent that there is no overlap with the inserted plug connector. The two bar end portions are now in a position from which they can be laterally displaced to a position in which they are axially aligned and spaced apart. That displacement is permitted because the deflecting guide member can be retracted to a position behind the bending plane. Now the deflection imparted to one bar end portion during the final bending operation can be reversed. This might be effected by means of a push rod, but is preferably effected in that a gripper is closed, which comprises a first gripping jaw, which is flush with the bending plane, and a second gripping jaw, which is disposed in front of or above the bending plane and movable against the latter so that that bar end portion which has been deflected out of the bending plane is forced and clamped by said second gripping jaw against the first gripping jaw. A second gripper is provided for acting on the opposite end portion of the tubular bar and also comprises a first gripping jaw having a gripping surface that is flush with the bending plane and a second gripping jaw, which from a position in front or above the backing wall is movable against the first gripping jaw. The movable gripping jaw of said second gripper when viewed in the direction from the frame-closing tool to that edge of the backing wall which is provided with the bending tools is disposed behind the depressing guide member so that the latter guides the associated bar end portion into the second gripper. The movable gripping jaw of the second gripper may be constituted, e.g., by the depressing guide member if the latter is displaceable and formed with a suitable gripping surface that is parallel to the backing wall.

When the two grippers have firmly gripped the two bar end portions, the grippers are moved toward each other and if a plug connector is used that end portion of such connector which protrudes from one end portion of the tubular bar is inserted into the other end portion of the tubular bar. The plug connector is preferably fixed in position in the tubular bar in that the latter is indented into a depression formed in the plug connector. For this purpose the frame-closing tool is preferably provided with an indenting tool, which is disposed between the grippers and is pivotally movable from a retracted position below or behind the bending plane against the tubular bar which is held in position by the grippers.

If the free ends of the tubular bar are joined by soldering or welding, the two grippers are moved toward each other until the free ends of the bar abut, and a soldering or welding tool is then moved against the abutting free ends of the bar and for that purpose may be pivotally moved from a retracted position below or behind the bending plate to an operating position above or in front of the bending plane.

When the two grippers have been opened and the preferably provided holding-down rollers have been pivotally raised, the completed spacer frame can be removed from the apparatus. The frame might be removed by hand but is preferably removed by mechanical means. The frame-closing tool provided in accordance with the invention affords the advantage that it can readily be designed as an implement for transferring the spacer frames to a conveyor for conveying the spacer frame out of the apparatus. That concept is desirably adopted in an embodiment in which the backing wall is inclined and is particularly inclined only by a few degrees from the vertical and the holder for the tubular bar to be bent and the bending tools are provided at the lower edge of the backing wall. In such an apparatus the conveyor is preferably provided adjacent to the opposite, top edge of the backing wall and is constituted by an overhead conveyor for conveying the spacer frames while they are suspended. As the frame-closing tool is movable up and down in any case to change its distance from the bottom edge of the backing wall, it is sufficient to provide for the frame-closing tool a path of travel which is so long that said tool can be moved up to a predetermined end position, in which the spacer frame can be taken over by the overhead conveyor. Whereas the frame-closing tool might be disposed in front of the backing wall, the path of travel of the frame-closing tool preferably extends into an upwardly and downwardly extending aperture formed in the backing wall so that only a portion of the frame-closing tool protrudes forwardly from the backing wall and the spacer frames can be more easily removed. In a particularly preferred embodiment the path for the frame-closing tool is not stationary but is movable so that said track and the frame-closing tool can be retracted in unison behind the bending plane. In that case the overhead conveyor which has taken over the spacer frames can remove the latter without any obstruction not only in a direction with its transverse to the plane of said spacer frames but also in said plane, i.e., parallel to the backing wall. The latter mode of operation will be particularly desirable because it will permit an unobstructed access to the entire apparatus and particularly to the bending tools from the front side of the apparatus.

The elements incorporated in the overhead conveyor and serving to carry the spacer frames suitably consist of hooks from which the spacer frames are suspended. The placing of the spacer frames onto the hooks can be facilitated in that each hook is pivoted on a horizontal axis so that the free end of the hook is disposed in front of the bending plane. The use of such hooks will afford the advantage that they will be deflected by the top portion of the spacer frame as the latter is raised in unison with the closing tool and that the hooks will then automatically swing under the top portion of the frame. Thereafter the frame-closing tool can be lowered so as to place the spacer frame onto the hook.

DETAILED DESCRIPTION OF THE PREFERRED EMBODIMENT

Figure 1:
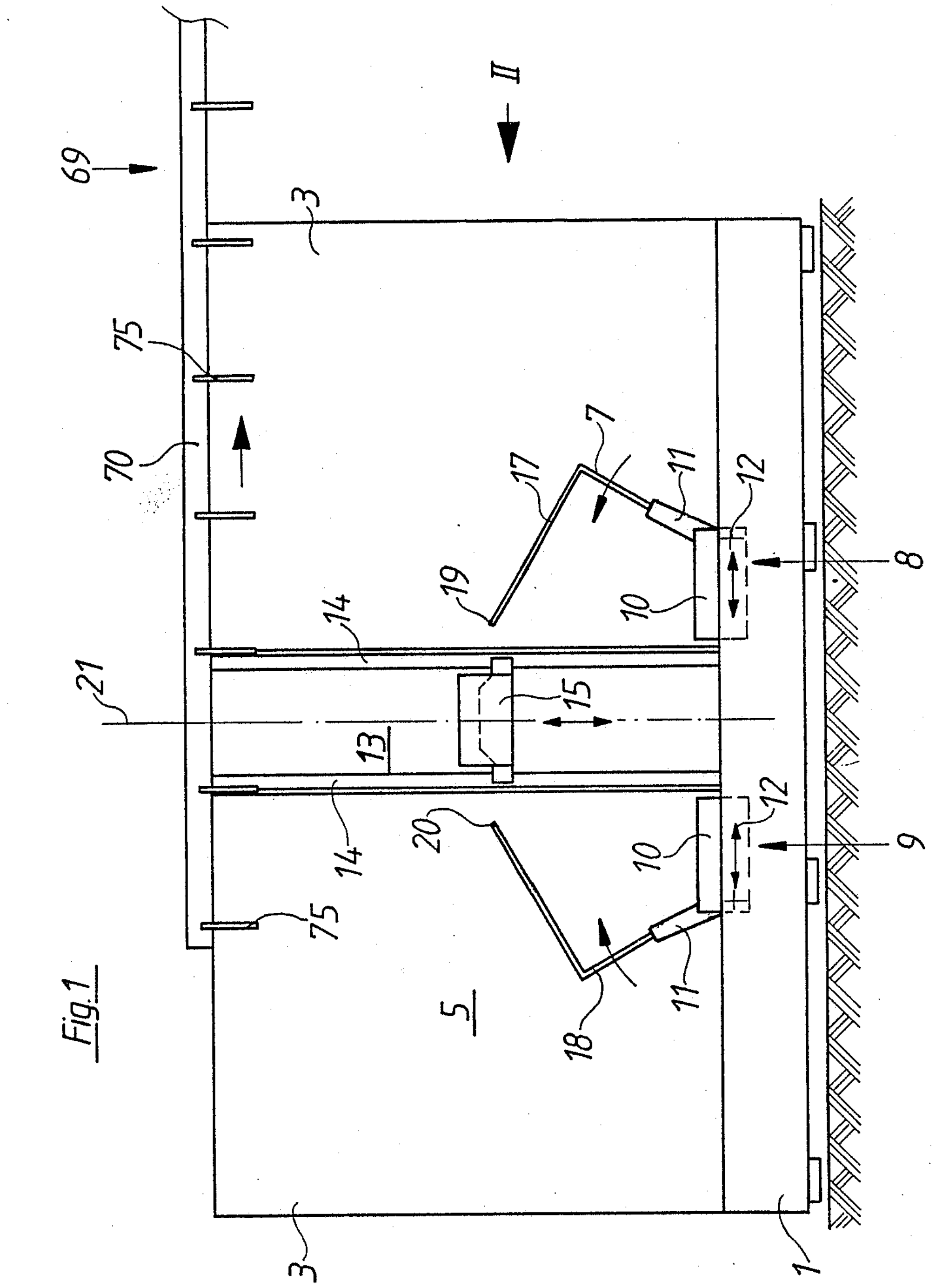
FIG. 1 is a front elevation showing the apparatus.
Figure 2:
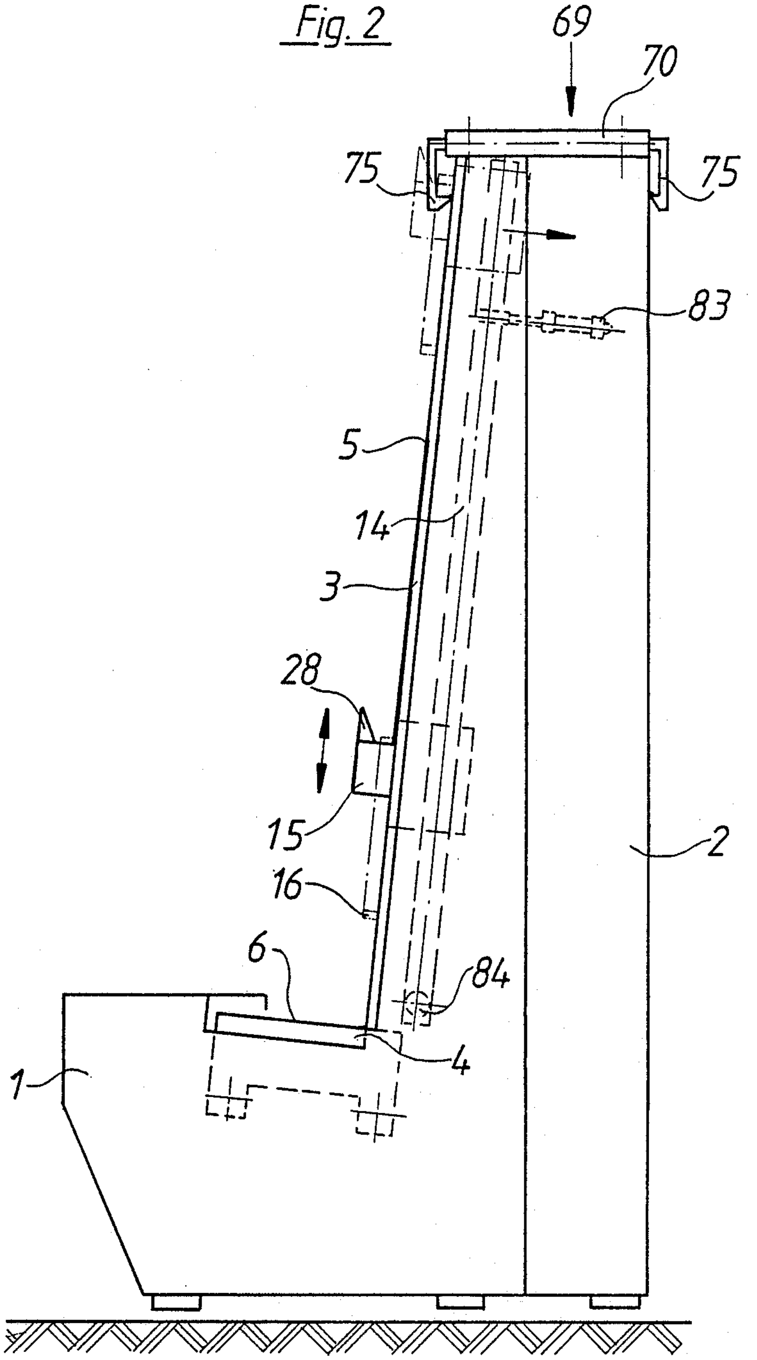
FIG. 2 is a side elevation showing the apparatus viewed in the direction of the arrow II in FIG. 1.
Figure 3:
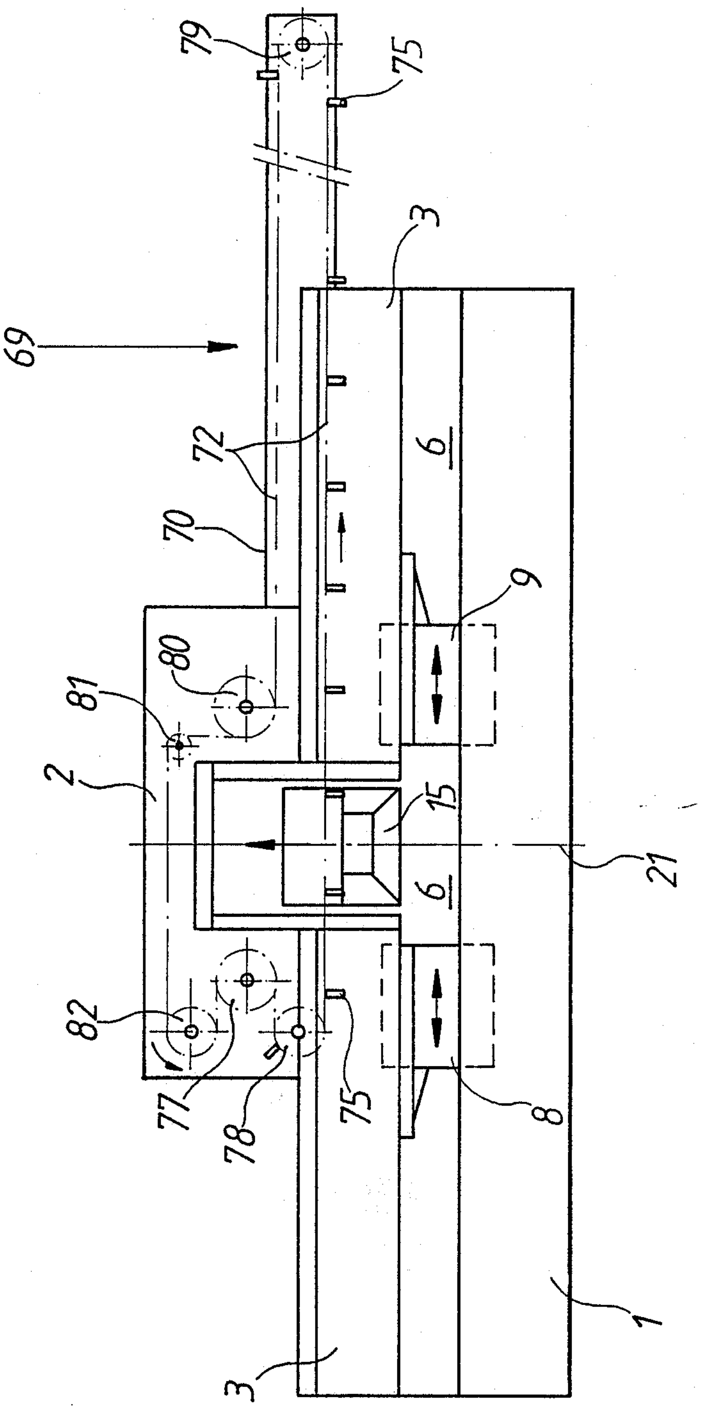
FIG. 3 is a top plan view showing the apparatus.

A preferred embodiment of the invention will now be described more in detail with reference to the diagrammatic drawings.

The apparatus comprises an underframe 1 and a column 2, which is rigidly connected to the rear of the underframe 1 at the center of its length. The underframe 1 carries a backing wall 3, which consists of two plates and is rearwardly inclined from the vertical by a few degrees and has a forward backing surface that defines a bending plane 5 of the apparatus. A holder 4 is provided at and extends along the horizontal bottom edge of the backing wall 3 and forms a bearing surface 6, which extends at right angles to the bending plane 5. The holder 4 serves to support tubular bars 7, which are to be bent to form spacer frames. The holder 4 presents the tubular bars to two bending tools 8 and 9, which are disposed near the horizontal bottom edge of the backing wall 3 and are displaceable along said bottom edge. For that purpose the bending tools 8 and 9 comprise respective carriages 10. The nature and design of the bending tools are no subject matter of the present invention and are known in the art and for this reason are not shown in detail. For instance, bending tools as described in German Patent Specification No. 32 23 881 may be used. In the illustrative embodiment shown on the drawings each of the bending tools 8 and 9 comprises a bending shoe 11, which is pivoted on an axis 12 that is at right angles to the bending plane 5. Each of the bending shoes 11 is pivotally movable upwardly about the associated axis 12 from a horizontal initial position through somewhat more than 90° so as to bend a tubular bar 7, which lies on the holder 4. To prevent a shifting of the tubular bar in its longitudinal direction during the bending operation the tubular bar 7 may also be clamped between the bending tools 8 and 9, e.g., by a gripping jaw which is not shown in the drawing and urges the tubular bar 7 against the holder 4 from above. The bending shoes 11 are pivotally moved through somewhat more than 90° so that the tubular bars 7 are over-bent to allow for a springback.

The two plates of the backing wall 3 are spaced apart so that the backing wall 3 is formed with an aperture or gap 13 extending from the bottom edge to the top edge of the backing wall. In that aperture 13, two parallel track rails 14 are disposed, which extend behind the bending plane and parallel to the latter from bottom to top. A frame-closing tool 15 is movable up and down on said track rails 14. Before or during the bending of a tubular bar 7, the frame-closing tool 15 is moved to such a frame-closing position that the final bending operation will impart to the end portions 17 and 18 of the tubular bar 7 a pivotal movement so that their free ends 19 and 20 enter the frame-closing tool 15. For that purpose the two bending tools 8 and 9 are disposed on opposite sides of the aperture or gap 13 which receives the frame-closing tool 15. In a preferred arrangement, the bending tools 8, 9 are arranged and designed like mirror images on opposite sides of the vertical center plane 21 of the frame-closing tool 15. In that case the bends will be symmetrical to the length center of the tubular bar 7 and the two end portions 17 and 18 which are pivotally moved into the frame-closing tool 15 will be equal in length.

The two bending tools 8 and 9 are suitably operated at the same time as has been explained in the general part of this description.

Figure 4:
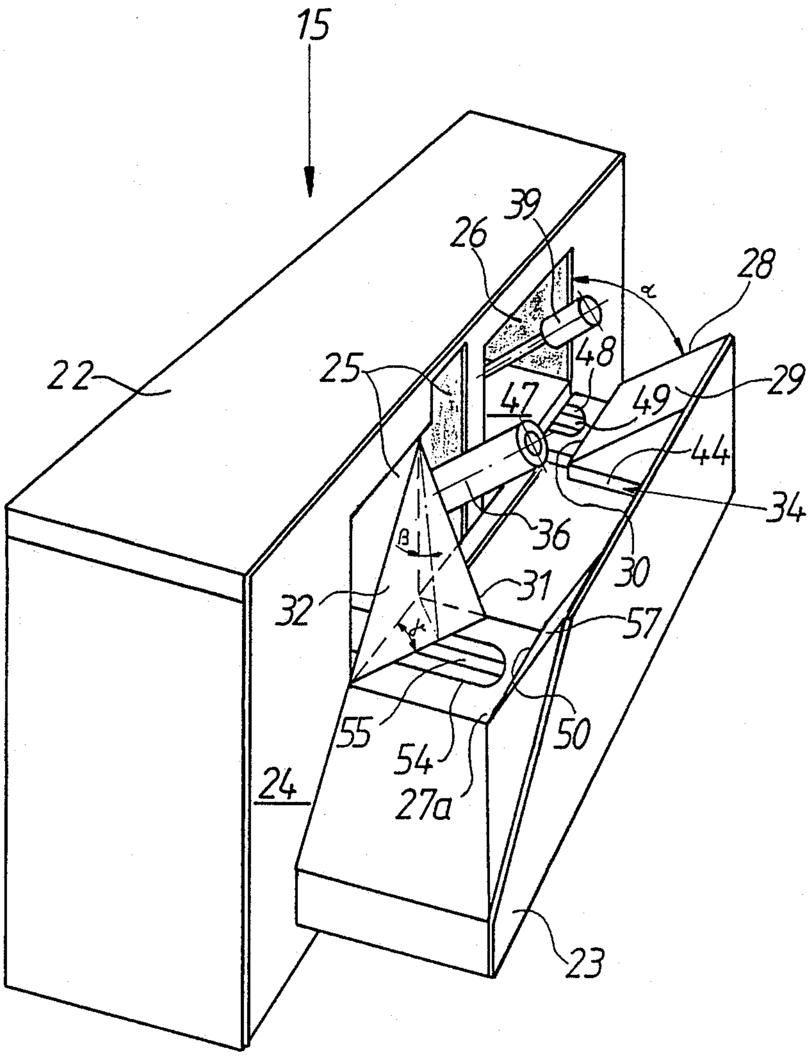
FIG. 4 is a perspective view showing the frame-closing tool of the apparatus.

The frame-closing tool 15 comprises tools for locating, gripping and joining the two end portions 17 and 18 of the tubular bar and also comprises the associated actuating means and a housing 22, which accommodates said tools and actuating means and has a forward bracket 23 (FIG. 4). Above the bracket 23, the planar front wall 24 of the housing 22 is formed with apertures 25 and 26, which permit various elements of the tool to be extended from and retracted into the housing 22.

The bracket 23 carries two stops 27 and 27*a*, which are spaced apart along the bottom edge of the backing wall and each of which has a stop face that is at right angles to the bending plane 5 and parallel to the bearing surface 6 of the holder 4. The stop faces of the two stops 27 and 27*a* are aligned with each other. A depressing guide member 28 is provided above the stop 27 and has a planar sliding surface 29, which faces the bending plane 5 and includes an upwardly open acute angle $\alpha$ with that bending plane so that the distance between the depressing guide member 28 and the bending plane 5 increases from bottom to top. A deflecting guide member 31 is provided above the stop 27*a* and has also a planar guiding surface 32, which faces opposite to the sliding surface 29 of the depressing guide member 28, i.e., away from the bending plane 5. In its operative position shown in FIG. 4 the sliding surface 29 includes an acute angle $\beta$ with the bending plane 5. Different from the angle $\alpha$, the angle $\beta$ is open downwardly. As is shown in FIG. 4 the planar sliding surface 32 includes with the bending plane 5 also an acute angle $\gamma$, which is measured in a plane that intersects the bending plane 5 at right angles thereto in a horizontal line. The acute angle $\gamma$ is open toward the depressing guide member 28. The oblique sliding surface 32 intersects the bending plane 5. From its operative position shown in FIGS. 4 and 5, the deflecting guide member 31 can be pivotally retracted into the housing 22 by means of a pneumatic cylinder 33 accommodated in the housing 22.

A vertical stop face 34 which extends at right angles to the bending plane 5 is formed in that end of the depressing guide member 28 which faces the deflecting guide member 31. Another stop 35 is closely spaced in that end face of the deflecting guide member 31 which faces the depressing guide member 28. The stop 35 has a stop face that is parallel to the stop face 34. The stop 35 is apparent from FIG. 5 and is concealed in FIG. 4.

A freely rotatable roller 36 is mounted close to the deflecting guide member 31 and is pivotally movable by means of a pneumatic cylinder 37 about a horizontal axis 38 out of the housing 22 through the aperture 25 from a retracted position in the housing 22. The roller 36 constitutes a holding-down member for forcing the end portion of the tubular bar against the stop 27*a* while permitting a longitudinal displacement of the end portion 18 because the roller 36 is freely rotatably. Another holding-down roller 39 is disposed close to the depressing guide member 28 and is also movable by a pneumatic cylinder 40 about a horizontal axis 41 out of the housing from retracted position in the housing 22. The holding-down roller 39 serves to force the other end portion 17 of the tubular bar against the stop 27.

The two stops 27 and 27*a* are carried by respective gripper carriages 42 and 43, which are horizontally displaceable in the housing 22 by pneumatic cylinders 85 and 86, respectively, to change the distance between the carriages 42 and 43. That portion of the gripper carriage 42 which protrudes into the hollow bracket 23 and constitutes the stop 27 carries a gripping jaw 44, which is disposed under the depressing guide member 28. By means of a pneumatic cylinder 46, which is moved in unison with the gripper carriage 42 by the pneumatic cylinder 85, the gripper carriage 42 carrying the gripping jaw 44 can be moved toward and away from the front wall 24 of the housing 22 to displace the gripping jaw 44 at right angles to the bending plane 5 and cooperates with an opposite stationary gripping jaw 47, which is fixed in the housing 22. The gripper carriage 42 has a slot 48, which contains a guide rod 49, which extends at right angles to the bending plane 5 through a sliding surface bearing in the stationary jaw 47 and holds the moving gripping jaw 44 in an orientation which is parallel to the stationary gripping jaw 47. When the frame-closing tool 15 is in its operating position, the gripping surface of the stationary gripping jaw 47 is flush with or disposed slightly behind the bending plane 5. The front housing wall 24 of the frame-closing tool 15 is also flush with the bending plane 5 or disposed slightly behind the same.

That portion of the gripper carriage 43 which protrudes from the housing 22 and carries the stop 27*a* is formed with a gripping jaw 50. By means of a pneumatic cylinder 52, which is movable by the pneumatic cylinder 86 in unison with the gripper carriage 43, the gripping jaw 50 and the gripper carriage 43 are movable at right angles to the bending plane 5 toward and away from the housing front wall 24. The gripping jaw 50 cooperates with a stationary gripping jaw 53, which is disposed near the housing front wall 24 behind the deflecting guide member 31 and has a gripping surface that always extends in the bending plane 5. The stationary gripping jaw 53 will be accessible when the deflecting guide member 31 has been pivotally retracted into the housing 22 by the associated pneumatic cylinder 33. The carriage 43 is also formed with a slot 54 and a guide rod 55 extends in said slot 54 at right angles the bending plane 5 through a sliding surface bearing formed in the stationary gripping jaw 54.

An oblique surface 57 is provided above the gripping surface 56, which is formed on the displaceable gripping jaw 50 and is parallel to the bending plane 5. Like the sliding surface 29 of the depressing guide member 28 the oblique surface 57 faces the bending plane 5 and serves also as a depressing guide but is steeper than the sliding surface 29.

Figure 5:
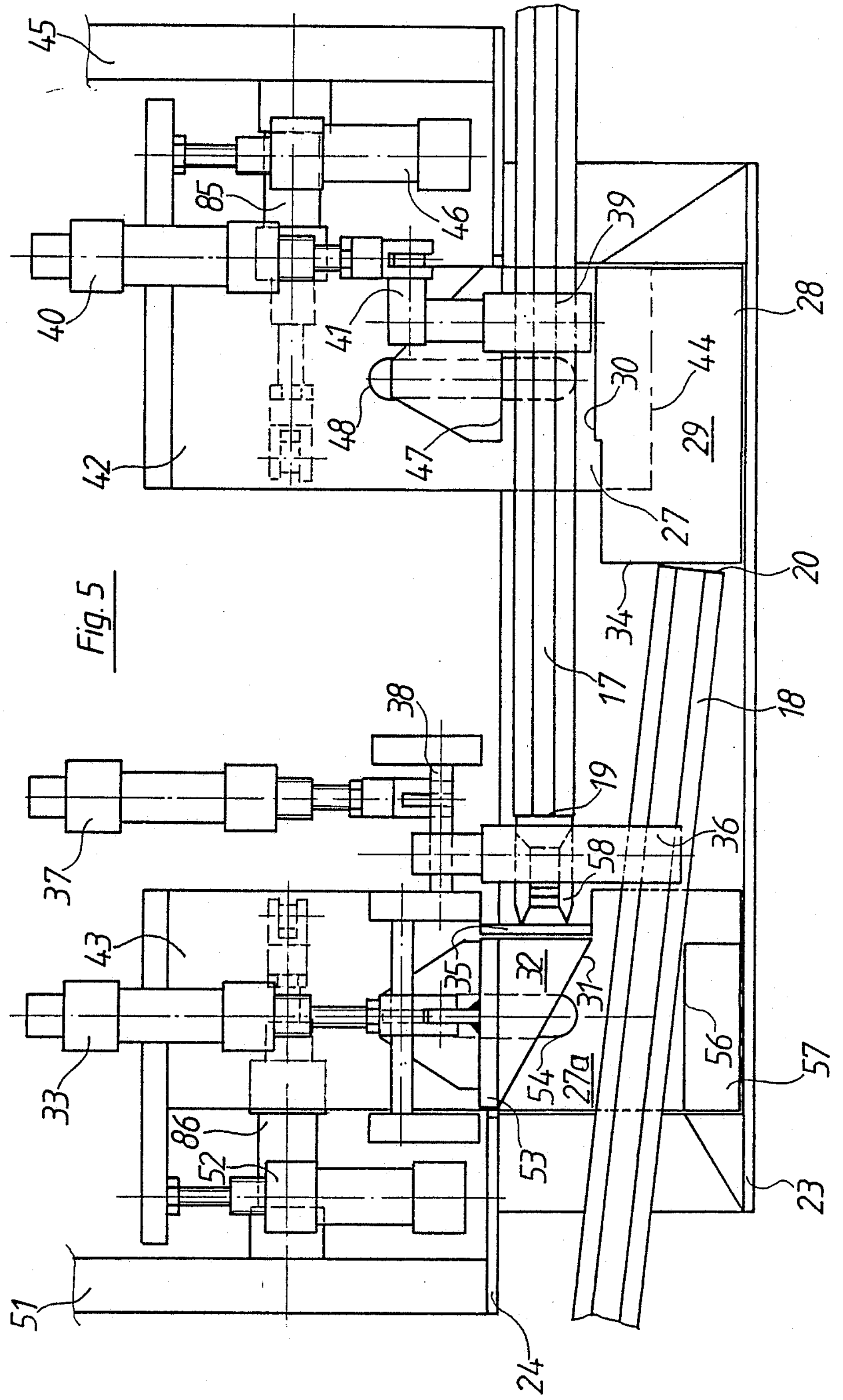
FIG. 5 is a top plan view showing the forward portion of the frame-closing tool when its housing has been removed and the tool is in the position assumed by it when the bending operations for making a spacer frame have been completed.
Figure 6:
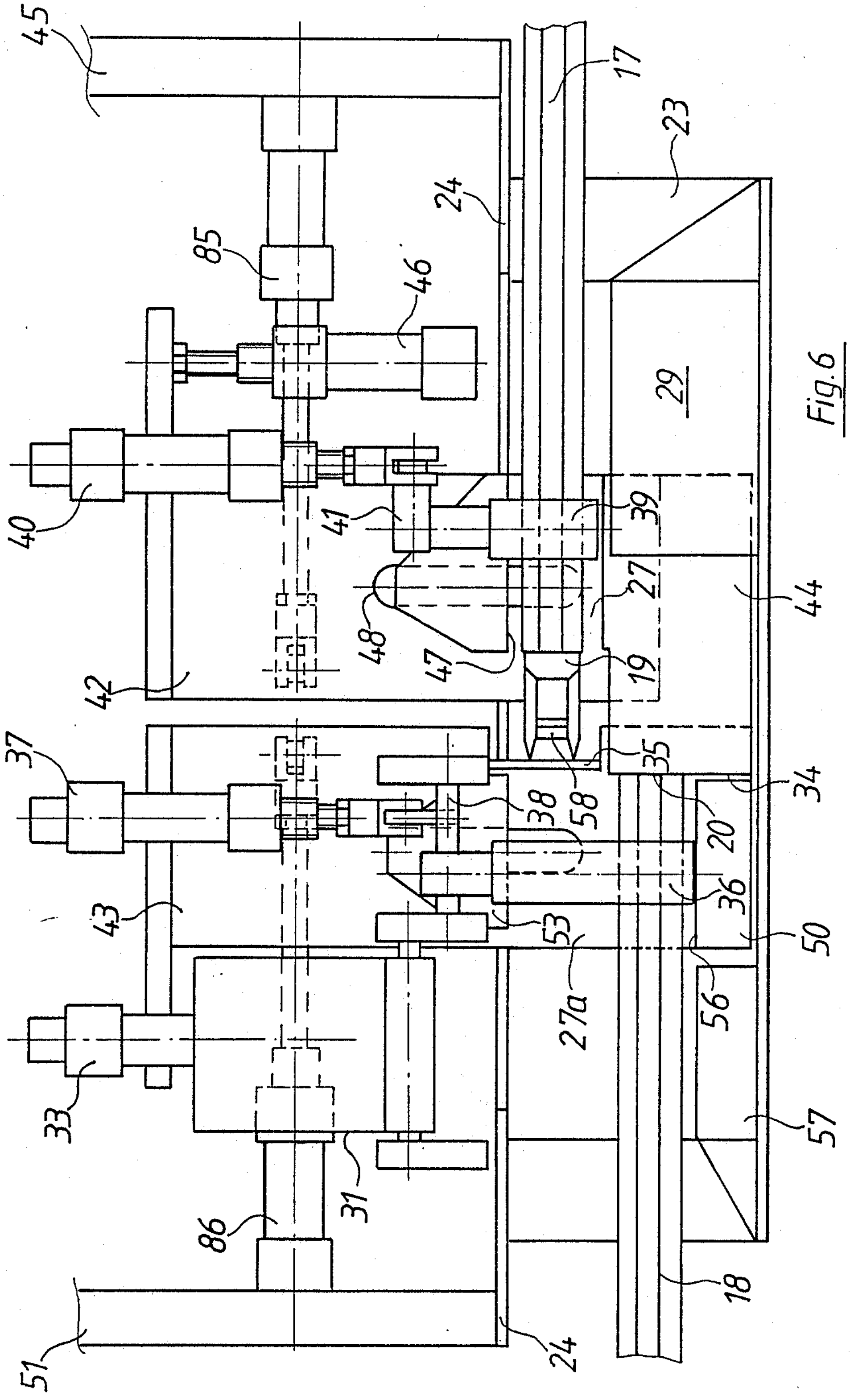
FIG. 6 is a top plan view showing the frame-closing tool as in FIG. 1 in conjunction with an expanded spacer frame.
Figure 7:
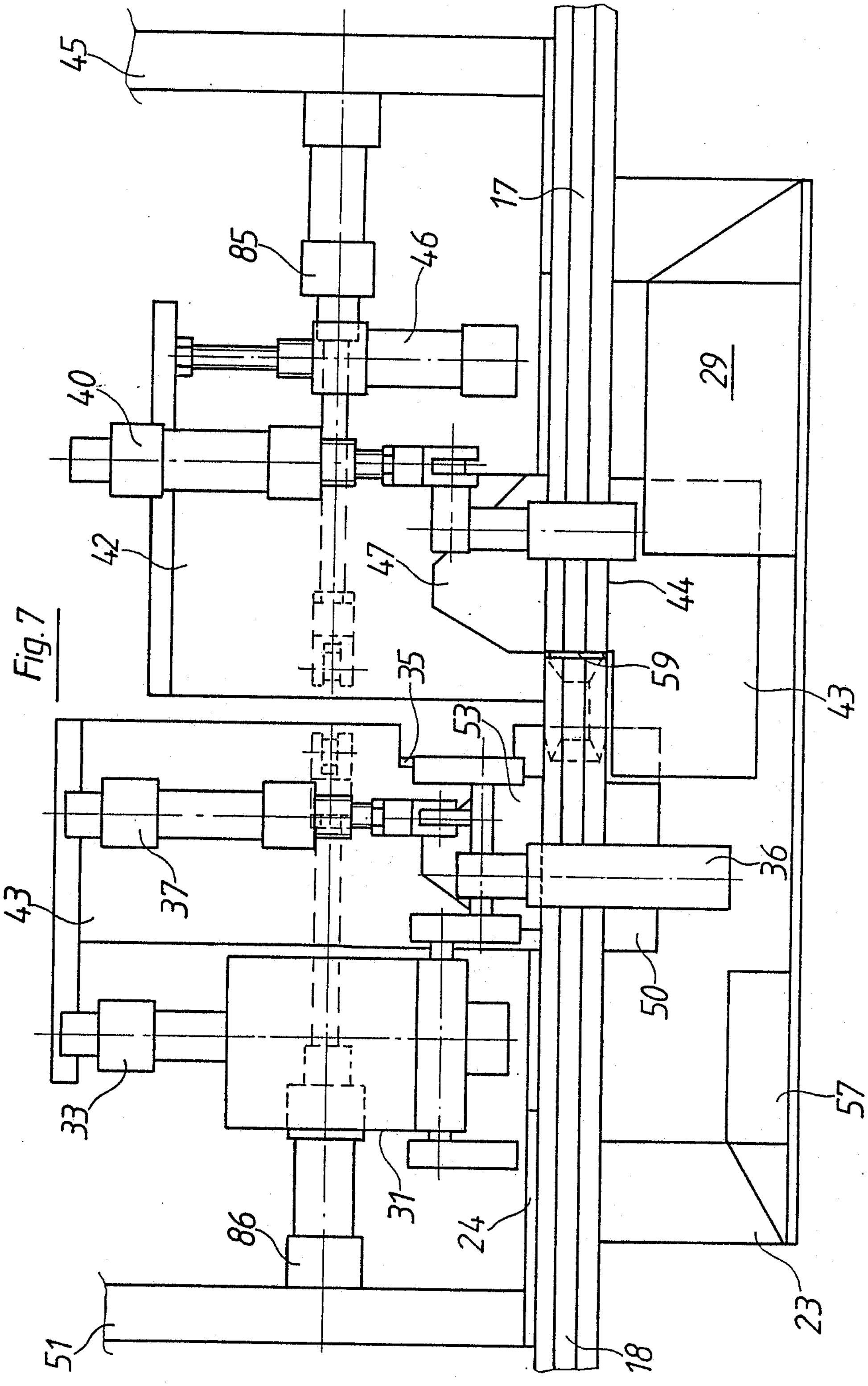
FIG. 7 is a top plan view showing the frame-closing tool as in FIG. 5 together with a closed spacer frame.
Figure 8:
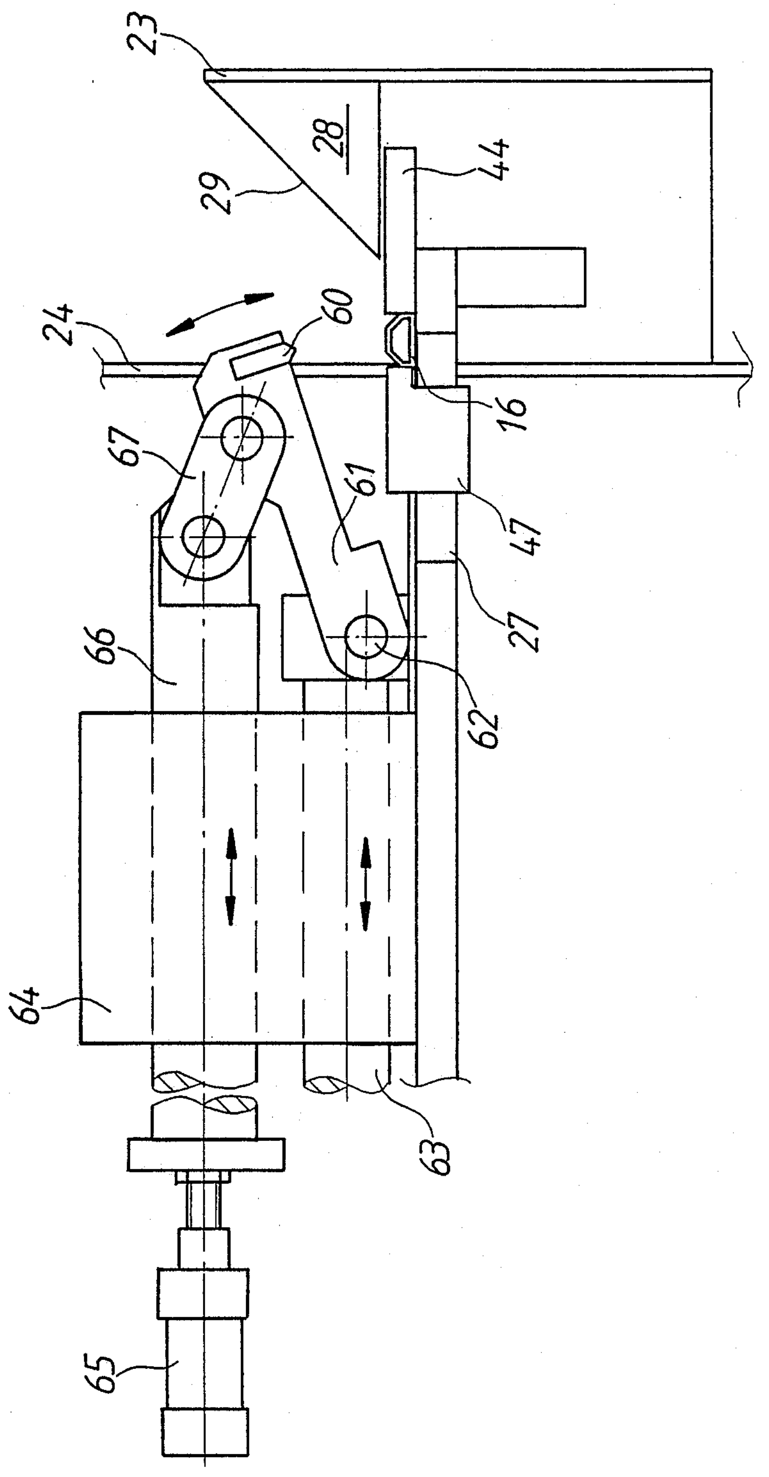
FIG. 8 shows a portion of the frame-closing tool and illustrates the arrangement and action of an indenting tool.
Figure 9:
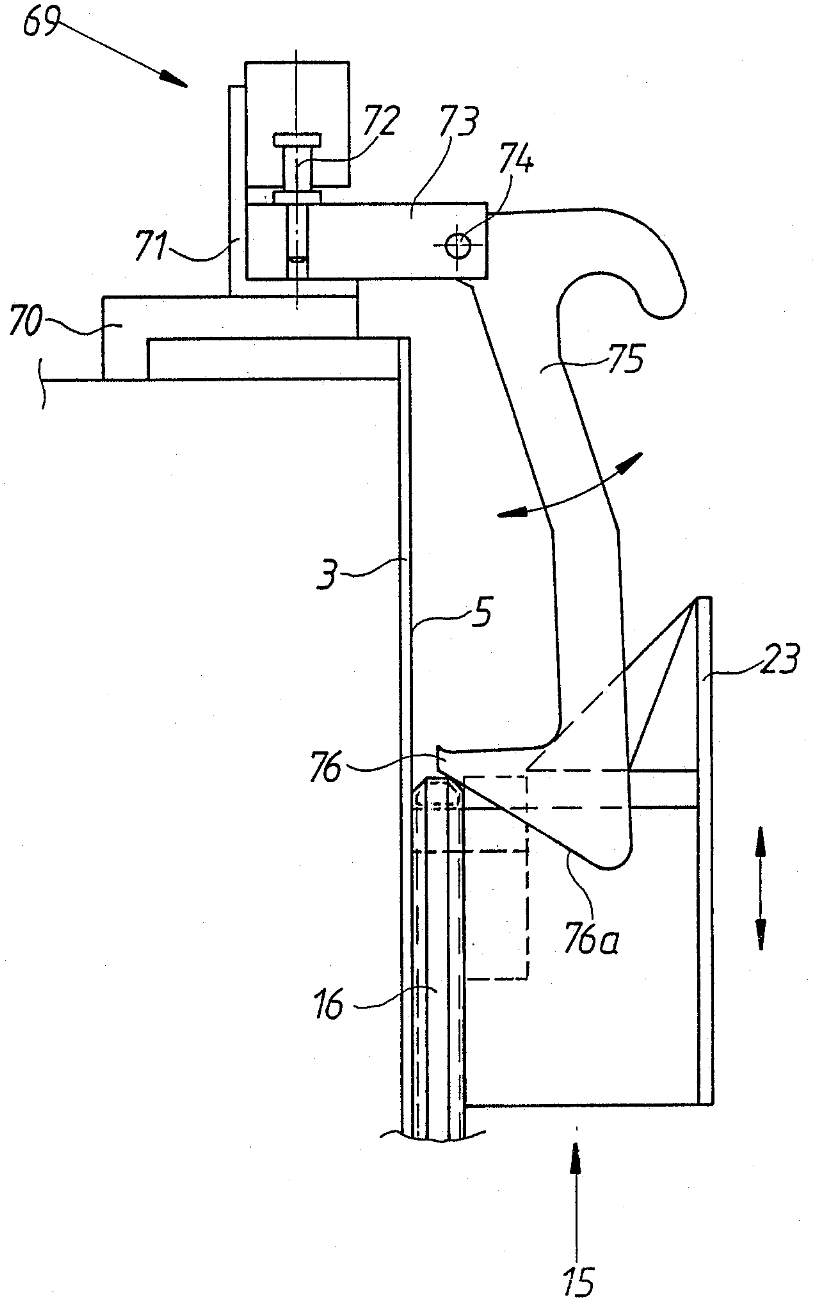
FIG. 9 is a detail view showing the design and arrangement of hooks which are suspended like a pendulum and belong to an overhead conveyor provided at the top edge of the apparatus.

An indenting tool 60 is provided between the two gripping carriages 42 and 43 and is not shown in FIGS. 5, 6 and 7 for the sake of clearness and is shown only as a detail in FIG. 8. The indenting tool 60 is disposed at one end of a swivel arm 61, which at its other end is connected by a pivot 62 to an end portion of a guide rod 63, which extends at right angles to the bending plane 5 and is guided in a guide block 64. By means which are not shown the guide rod 63 is connected to the gripper carriage 42 so that the guide rod 63 is displaced together with the movable gripping jaw 44 to an extent which is one-half of the extent of the displacement of the movable gripping jaw 44. This arrangement will ensure each tubular bar 7 and will be indented by the indenting tool at the center of the width of the tubular bar 7 regardless of its width. The swivel arm 61 is pivotally moved by a pneumatic cylinder 65 through the intermediary of another guide rod 66, which is guided in the same guide block 64 and is connected by a link 67 to the swivel arm 61.

An overhead conveyor 69 for removing the completed spacer frames 16 extends along the top edge of the backing wall 3 and comprises a horizontal frame 70, which extends along the top end of the backing wall 3 and bears on said top edge and on the central column 2 and protrudes beyond the outer end of one of the plates of the backing wall 3. The frame 70 is provided with a track rail 71, which supports an endless roller chain 72, which is trained around and tensioned by chain sprockets 77 to 82 having vertical axes of rotation. One of said chain sprockets, e.g., the chain sprocket 82 is driven. The chain 72 comprises regularly spaced apart swivel pins, which protrude above the top link plates of the chain and are fit into bearing blocks 73 which preferably consist of plastic. A swivel hook 75 depends from each of said bearing blocks 73 and is pivoted thereto on a horizontal pivot 74, which extends in the direction of travel of the chain 72. The hooks 75 are mounted in such an orientation that the free ends 76 of those hooks which are carried by the forward course of the chain are in sliding contact with the backing wall 3.

The apparatus operates as follows: A tubular bar 7 is placed on and preferably fixed to the holder 4 provided at the bottom edge of the backing wall 3. The two bending tools 8 and 9 are operated to form two 90° bends in the tubular bar 7 so that the bar 7 has the shape of a U. The two bending tools 8 and 9 are then displaced toward each other. Thereafter the tubular bar 7 is bent through slightly more than 90° at two additional locations disposed between the previously formed bends. Said two bends are preferably formed at the same time by a final bending operation, which causes the end portions 17 and 18 of the tubular bar 7 to perform a pivotal movement and their free ends 19 and 20 move into the range of action of the frame-closing tool 15, when the latter has previously been moved to the required frame-closing position. In that operation the depressing guide member 28 moves the bar end portion 17 to the bending plane 5, which coincides with the planar front surface of the backing wall 3, unless that end portion 17 is already in contact with the backing wall 3. Throughout the bending operations the housing front wall 24 of the frame-closing tool is flush with or disposed slightly behind the bending plane 5.

The other end portion 18 of the tubular bar 7 slides in contact with the deflecting guide member 31 and is thus disengaged from the forward surface of the backing wall 3 toward the end of the final bending operation. This will ensure that the free ends 19 and 20 of the tubular bar 7 will not strike against each other at the end of the final bending operation even when a plug connector 58 has previously been inserted into one of said free ends, such as the end 19. FIG. 5 shows a typical arrangement of the free ends 19 and 20 at the end of the final bending operation. The two end portions 17 and 18 are forced against the stops 27*a* and 27, respectively, by the holding-down rollers 36 and 39. The angle between the end positions 17 and 18 is exaggerated in FIG. 5.

The gripper carriage 42 is subsequently moved toward the gripper carriage 43 and the latter is moved toward the gripper carriage 42 at the same time. During that operation the stop face of the depressing guide member 28 acts on the free end 20 and the stop 33 which is provided on the gripper carriage 43 and initially disposed adjacent to the deflecting guide member 31 acts on the free end of the plug connector 58 so that the spacer frame 16 formed by the bent tubular bar 7 is expanded until its free end 20 and the plug connector 58 no longer overlap. The resulting position is shown in FIG. 6. The pneumatic cylinder 33 is operated at the same time or thereafter to pivotally retract the deflecting guide member 31 into the housing 22 to clear a path on which the end portion 18 of the tubular bar 7 can be moved into axial alignment with the other end portion 17. For that purpose the pneumatic cylinder 52 is operated to close the gripper which is constituted by the gripping jaws 50 and 53. The pneumatic cylinder 46 is operated at the same time to close the gripper which consists of the gripping jaws 44 and 47 so that they grip the end portion 17. Now the two end portions 17 and 18 are axially aligned. The two gripping carriages 42 and 43 can now be approached more closely to each other so that the protruding end portion of the plug connector 58 is inserted into the one free end 20 of the tubular bar 7 to close the spacer frame 16. On principle, it does not matter whether one or both of the gripper carriages 42 and 43 are moved. It is preferred to move only one gripping carriage, e.g., the gripping carriage 43, and to displace said gripper carriage 43 over a distance which is slightly in excess of the length in which the plug connector 58 is inserted. In that case the plug connector will reliably be inserted as far as to the stop which is usually provided at the length center of the connector. The displacement of the gripper carriage 43 in excess of the inserted length will result in a slip, which is suitably taken up in that the gripping surfaces of the gripping jaws 50 and 53 have a sufficiently high surface finish. No slip is desired on the other two gripping jaws 44 and 47 and is suitably avoided in that their gripping surfaces are corrugated or fluted. When the two end portions 17 and 18 have been plugged together, the spacer frame 16 is in the position shown in FIG. 7. The pneumatic cylinder 65 is then operated to pivotally move the indenting tool 60 against the top surface of the spacer frame to indent the same on both sides of the joint 59 defined by the free ends 19 and 20. This indenting is permitted in that the plug connector 58 is formed with a corresponding recess or aperture at those points.

As soon as the spacer frame 16 which has been formed but has not yet been closed has been released by the bending tools 8 and 9 and the holding-down rollers 36 and 39 force the end portions 17 and 18 against the stops 27 and 27*a*, respectively, the entire frame-closing tool 15 may begin its upward movement along the track rails 14. At least part of the operations by which the end portions of the tubular bar are located and joined may be performed during that movement. Shortly before the frame-closing tool 15 has reached its intended top end position the top surface of the spacer frame 16 strikes against the oblique surfaces 76*a* of the hooks 75 of the overhead conveyor 69 and the hooks 75 will automatically yield to the rising spacer frame 16 and when the rising spacer frame 16 has risen past the free ends 76 of the hooks the latter will swing back against the backing wall 3. The holding-down rollers 36 and 38 may now be disengaged from the closed spacer frame 16 and may be pivotally retracted into the housing 22. At the same time, the grippers consisting of the gripping jaws 44, 47 and 50, 53, respectively, may be opened to release the spacer frame 16. To permit the spacer frame 16 to be taken over by the overhead conveyor 69 the frame-closing tool 15 is lowered to some extent so that the hooks 75 of the moving overhead conveyor 69 carry the spacer frame 16 out of the range of action of the frame-closing tool. A fluid-operable cylinder 83 acting on the upper portion of the track rails 14 is now operated to impart to the two track rails 14 a rearward pivotal movement about a lower horizontal axis 84 until the bracket 23 of the closing tool 15 has been entirely retracted behind the bending plane 5. The overhead conveyor 69 can now carry the spacer frame 16 along in a direction which is parallel to the bending plane 5 without an obstruction by the frame-closing tool 15. As soon as the spacer frame 16 has been moved out of the range of action of the frame-closing tool, the latter can be pivotally moved forwardly to its operative position and can be lowered to the elevation required for the next spacer frame which is to be made.

We claim:

1. Apparatus for manufacturing a rectangular spacer frame for use in the manufacture of insulating glass in a process in which a tubular bar having two opposite free end portions, is bent four time in a common bending plane to form said frame and said free end portions are joined to each other to close said frame, comprising a backing wall having an edge and a backing surface defining said bending plane;

a holder extending adjacent to and along said edge and adapted to support said tubular bar adjacent to said bending plane;

bending tool means disposed adjacent to said horizontal edge and operable to bend said tubular bar in said bending plane when said tubular bar is supported by said holder adjacent to said bending plane, said bending tool means being operable to perform a final bending operation in which said free end portions of said bar are caused to approach each other to form said frame;

the improvement residing in that said apparatus comprises a frame-closing tool for assuming a frame-closing position and for joining said free end portions of said bar to each other so as to close said frame when said tool is in said frame-closing position after said final bending operation and for carrying said frame when it has been closed;

tool-displacing means for displacing said frame-closing tool to and away from said frame-closing position along a path which extends parallel to said backing surface and at right angles to said edge of said backing wall;

deflecting means carried by said tool and arranged to deflect one of said free end portions out of said bending plane when said tool is in said frame-closing position during said final bending operation;

locating means carried by said tool and operable to locate said free end portions after said final bending operation in an aligned position, in which said free end portions are axially aligned and spaced apart;

two grippers, which are carried by said tool and adapted to respectively grip said free end portions in said aligned position at two points spaced apart along said edge; and gripper displacing means, which are carried by said tool and operable to displace said grippers along said edge toward each other so that said free end portions are gripped by said grippers in said aligned position and are moved close to each other.

2. The improvement set forth in claim 1, wherein said backing surface is a horizontal surface.

3. The improvement set forth in claim 1, wherein said backing surface is an inclined surface.

4. The improvement set forth in claim 1, wherein said bending tool means comprises a plurality of bending tools spaced along said edge.

5. The improvement set forth in claim 1, wherein said tool carries stop means arranged to engage said free end portions on the inside of said frame on the same level when said tool is in said frame-closing position after said final bending operation.

6. The improvement set forth in claim 5, wherein said tool carries two holding-down rollers, which are operable to force said two free end portions against said stop means; and roller-operating means for pivotally moving said rollers between a retracted position behind said backing surface and an operating position for engaging said free end portions.

7. The improvement set forth in claim 5, wherein said tool carries an indenting tool for indenting said end portions when they engage said stop means and said free end portions are close to each other and means for pivotally moving said indenting tool between a retracted position behind said backing surface and an operating position adjacent to said stop means.

8. The improvement set forth in claim 1, wherein said deflecting means comprises a deflecting guide member, which is movable between a retracted position behind said backing surface and a deflecting position in front of said backing surface and comprises a sliding surface, which when said deflecting member is in said deflecting position forms an oblique angle with said bending plane and when said tool is in said frame-closing position is arranged to slidably engage and deflect said one free end portion away from said backing surface during said final bending operation.

9. The improvement set forth in claim 1, wherein said locating means comprises first and second end stops, which are spaced an adjustable distance apart along said edge and when said tool is in said frame-closing position are adapted to be engaged by said free end portions of said bar at the end of said final bending operation.

10. The improvement set forth in claim 1, wherein said tool carries a depressing guide member which has a sliding surface that forms an oblique angle with said bending tool and when said tool is in said frame-closing position is arranged to slidably engage and urge the other of said free end portions towards said backing surface.

11. The improvement set forth in claim 10, wherein said deflecting means comprises a deflecting guide member, which is movable between a retracted position behind said backing surface and a deflecting position in front of said backing surface and comprises a sliding surface, which when said deflecting member is in said deflecting position forms an oblique angle with said bending plane and when said tool is in said frame-closing position is arranged to slidably engage and deflect said one free end portion away from said backing surface during said final bending operation.

12. The improvement set forth in claim 11, wherein said locating means comprises first and second end stops, which are spaced an adjustable distance apart along said edge and when said tool is in said frame-closing position are adapted to be engaged by said free end portions of said bar at the end of said final bending operation; and said deflecting guide member and said depressing guide member are spaced apart along said edge;

said deflecting guide member has adjacent to said first end stop a first end face facing said depressing guide member;

said depressing guide member has adjacent to said second end stop a second end face facing said deflecting guide member.

13. The improvement set forth in claim 1, wherein each of said two grippers comprises a first gripping jaw having a first gripping surface, which is arranged to extend in said bending plane when said tool is in said frame-closing position;

a second gripping jaw, which has a gripping surface facing said first gripping surface; and gripper-operating means for moving said second jaw toward and away from said first jaw transversely to said bending plane.

14. The improvement set forth in claim 13, wherein said second jaw of one of said grippers constitutes a depressing guide member which has a sliding surface that forms an oblique angle with said bending tool and when said tool is in said frame-closing position is arranged to slidably engage and urge said other end portion toward said backing surface.

15. The improvement set forth in claim 13, wherein said tool carries a depressing guide member which has a sliding surface that forms an oblique angle with said bending tool and when said tool is in said frame-closing position is arranged to slidably engage and urge said other end portion toward said backing surface, and said depressing guide member is disposed between said second jaw of one of said grippers and said holder.

16. The improvement set forth in claim 1, wherein said backing wall is inclined and has top and bottom horizontal edges;

said holder is disposed adjacent to and extends along said bottom edge; and an overhead conveyor extends adjacent to and along said top horizontal edge and is operable to take over and convey said spacer frames along a predetermined path of travel; and said tool-displacing means are operable to raise said tool from said frame-closing position to such an elevation that said closed frame carried by said tool extends into said path of travel.

17. The improvement set forth in claim 16, wherein said backing wall has an aperture extending at right angles to said horizontal edges and containing said tool and said tool-displacing means are operable to displace said tool in said aperture.

18. The improvement set forth in claim 17, wherein said tool is movable to a retracted position behind said bending plane.

19. The improvement set forth in claim 16, wherein said overhead conveyor comprises a plurality ho hooks, which are spaced apart along said path of travel and adapted to suspend said spacer frame;

each of said hooks is pivoted on a horizontal axis which is parallel to said bending plane;

each of said hooks has a free end that is remote from said horizontal axis and contacts said backing surface.

20. The improvement set forth in claim 16, wherein said backing surface is inclined only a few degrees from the vertical.

21. The improvement set forth in claim 16, wherein said tool is movable to a retracted position behind said bending plane; and said path of travel of said conveyor is parallel to said backing surface.

* * * * *